United States Patent

Blomberg et al.

Patent Number: 5,827,438
Date of Patent: Oct. 27, 1998

[54] ELECTRICALLY MODULATABLE THERMAL RADIANT SOURCE WITH SPECIFIC FILAMENT

[75] Inventors: Martti Blomberg, Vantaa; Altti Torkkeli, Espoo; Stefan Lindblad, Koivulahti; Ari Lehto, Helsinki, all of Finland

[73] Assignee: Vaisala Oy, Helsinki, Finland

[21] Appl. No.: 754,128

[22] Filed: Nov. 22, 1996

[30] Foreign Application Priority Data

Nov. 24, 1995 [FI] Finland ................................. 955657

[51] Int. Cl.⁶ .................................................... H05D 3/00
[52] U.S. Cl. ........................ 219/544; 219/543; 392/407; 313/578; 313/15; 313/325
[58] Field of Search ............... 313/578, 15, 325; 392/407; 219/543, 544

[56] References Cited

U.S. PATENT DOCUMENTS

| | | |
|---|---|---|
| 5,068,517 | 11/1991 | Tsuyuki et al. . |
| 5,285,131 | 2/1994 | Muller et al. . |
| 5,464,966 | 11/1995 | Gaitan et al. . |
| 5,500,569 | 3/1996 | Blomberg et al. ................ 313/578 |
| 5,644,676 | 7/1997 | Blomberg et al. ................ 392/407 |

FOREIGN PATENT DOCUMENTS 2276975  10/1994  United Kingdom .

OTHER PUBLICATIONS

VLSI Technology International Student Edition, McGraw–Hill Series in Electrical Engineering 1983.

"Micromachined Thermal Radiation Emitter from a Commercial CMOS Process" IEEE Electron Device Letters, vol. 12 No. 2, Feb. 1991, pp. 57–59 by M. Parameswaran et al.

"Electrical and Optical Characteristics of Vacuum–Sealed Polysilicon Microlamps" IEEE Transactions on Electron Devices, vol. 39 No. 6, Jun. 1992 pp. 1363–1375 by C.H. Mastrangelo et al.

"Integrated Transducer Based on Blackbody Radiation from Heated Polysilicon Filaments" IEEE 1985 pp. 364–366, H. Guckel et al.

"Lightbulb–on–a–Chip" *Semiconductor International* Nov. 1992, p. 17.

*Primary Examiner*—Sandra L. O'Shea
*Assistant Examiner*—Matthew J. Gerike
*Attorney, Agent, or Firm*—Birch, Stewart, Kolasch & Birch, LLP

[57] ABSTRACT

The invention is related to an electrically modulatable thermal radiant source with a multilayer structure. The radiant source includes a substrate, a first insulating layer formed onto the substrate, a radiant surface layer formed onto the first insulating layer, a second insulating layer formed on the radiant surface layer, a first metallization (incandescent filament) layer formed on the second insulating layer, a third insulating layer formed on the first metallization layer, and a second metallization layer for contacting formed on the third insulating layer. According to the invention, very thin incandescent filaments are formed from the first metallization layer and surrounded by the other elements of the multilayer structure as a uniform, planar plate.

20 Claims, 1 Drawing Sheet

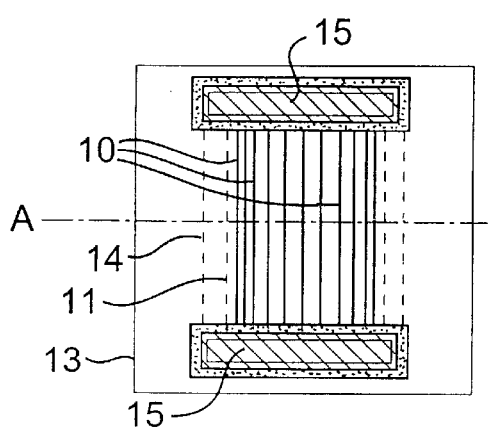
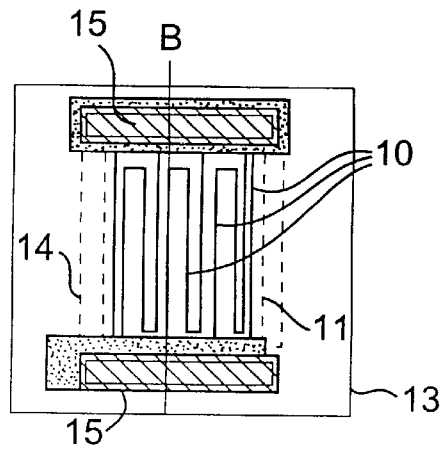
FIG. 1a        FIG. 1b
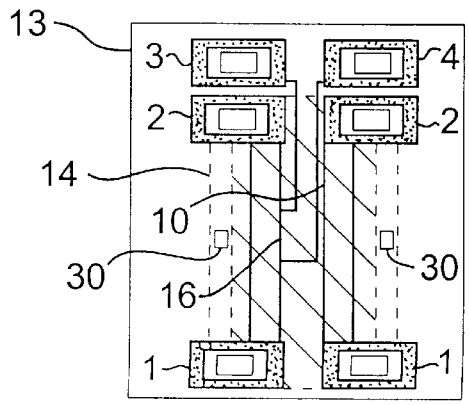
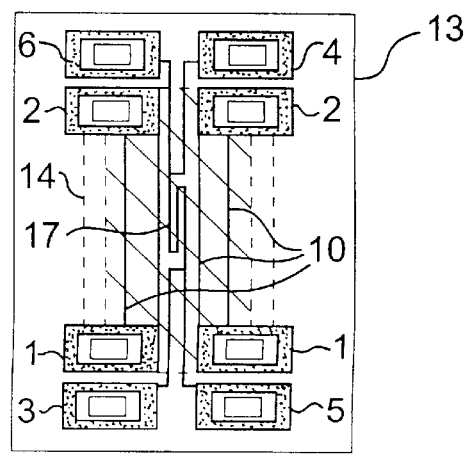
FIG. 2a        FIG. 2b
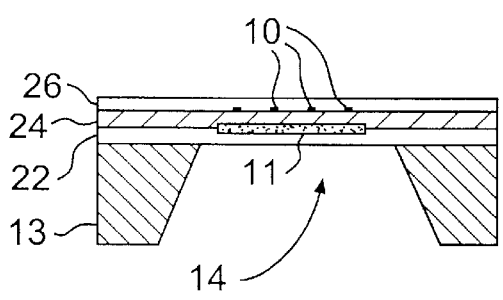
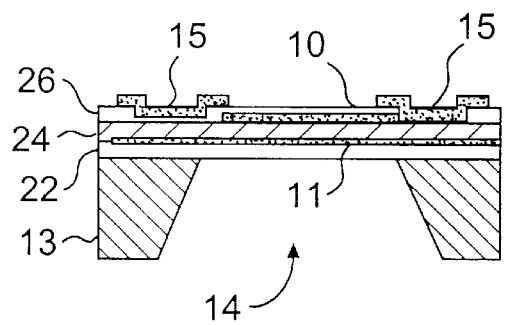
FIG. 3a        FIG. 3b

ELECTRICALLY MODULATABLE THERMAL RADIANT SOURCE WITH SPECIFIC FILAMENT

BACKGROUND OF THE INVENTION

1. Field of the Invention

The present invention relates to an electrically modulatable thermal radiant source.

2. Description of Related Art

Infrared radiant sources are used in optical analysis methods as IR radiation sources, and in some other applications as heat sources. Several different types of IR sources are used for the former application such as the "globar" source, the incandescent lamp and the thick-film radiator. The intensity of the radiation beam emitted by the IR source can be modulated by altering the source temperature through varying the input power to the source, or alternatively, using a mechanical beam-interrupting device, called "chopper" simultaneously keeping the source temperature as constant as possible.

When a mechanically actuated chopper is used for modulating the beam, the mean time between failure of the radiant source unit is usually limited by the chopper mechanism life, which typically is from a year to two years under continuous operation. An electrically modulated source provides a much longer time between failure.

The main application of the present invention is in optical analysis techniques as a thermal radiant source electrically modulatable at a high rate.

In the art, a variety of methods are known for implementing a thermal radiant source. Analogous to its name, a "globar" is a glowing bar. The bar is conventionally made from a ceramic material heated with electric current. Typically, a "globar" device is a few millimeters thick and a few centimeters long, whereby its thermal time constant is several seconds. The "globar" is not usually modulated by varying the power input to the device. The heating input power typically is in the range from a few watts to a hundred watts. A variant of the "globar" device is a ceramic bar having a resistance wire wound about the bar. The thermal properties of the variant are equivalent to those of the simple "globar".

An incandescent lamp can be electrically modulated with frequencies up to a few ten Hz, even up to several hundred Hz, but the glass bulb of the lamp absorbs radiation in the infrared range and blackens under continuous operation, whereby the output intensity of radiation delivered by the lamp decreases with time. The required heating input power is typically from a few watts to tens of watts.

A thick-film radiator typically comprises a thick-film resistor formed onto an alumina substrate and heated by electric current. The size of the resistor typically is in the order of a few square millimeters with a thickness of half a millimeter. The thermal time constant of the resistor typically is in the order of seconds and the required power input is a few watts.

Conventional production techniques used in microelectronics and micromechanics provide the ability to produce miniature size, electrically modulatable radiant sources from silicon.[1,2,3] Such devices have a thin-film structure of mono- or polycrystalline silicon with a typical thickness of approx. one micrometer and a length of hundreds of micrometers. The width of the thin-film resistive element may vary from a few micrometers to tens of micrometers. The thermal capacity of such a silicon incandescent filament is low permitting its modulation with frequencies up to hundreds of hertzes. Pure silicon is an inferior conductor for electric current. However, by doping it with a proper dopant such as, e.g., boron or phosphorus, excellent conductivity is attained. Boron as a dopant is handicapped by the fact that its activation level is not stable, but rather, is dependent on the earlier operating temperature of the silicon incandescent filament. This causes the activation level to continually seek a new equilibrium state, which means that the resistance of the filament drifts with time, and so does the heating input power to the filament unless the input power level is not externally stabilized. The highest impurity concentration possible in silicon with a dopant is approx. $5 \cdot 10^{19}$ atoms/$cm^3$. Other conventional dopants are arsenic and antimony. A problem encountered with these elements as dopants is the difficulty in achieving adequately high impurity concentrations for attaining a sufficiently high conductivity for low-voltage use.

The incandescent filament discussed in cited publication 1 is made by doping with phosphorus to achieve a sheet resistance greater than 50 $\Omega$/square. The incandescent filament is 100 $\mu$m long, 20 $\mu$m wide and 1.2 $\mu$m elevated from the substrate. In such a structure, the radiant power loss over the air gap to the substrate is particularly high, and a high risk of the filament adhering to the substrate is evident as the filament sags during heating. Both boron and phosphorus doping have a problem related to the migration of dopant atoms. This manifests itself in the form of a hot zone developing at that end of the filament wherefrom the dopant atoms have migrated away. Resultingly, the emission intensity profile of the incandescent filament undergoes a gradual change, which is observed as a long-term instability.

The structure of the incandescent filament discussed in cited publication 2 comprises encapsulation under a thin-film window and placing the incandescent filament in a vacuum to avoid burn-out. Such a window cannot be wider than a few tens of micrometers, whereby the total surface area of the filament, and accordingly, its radiant output remain small. To avoid adherence of the filament, a V-groove is etched into the substrate.

The IR empitter discussed in cited publication 3 has a size of 100 $\mu$m by 100 $\mu$m and uses two meandering polysilicon resistors as the heating element. Such a structure is prone to warp during heating, and large-area emitting elements cannot be manufactured by way of this concept. Though the heating element has a continuous form, the gas bubbles emerging during the etching phase of the substrate cause no problems as the heating element size is small in comparison with the openings about it.

However, the temperature distribution pattern of this structure is not particularly good as is evident from FIG. 2 of cited publication.

An incandescent filament made from doped polysilicon is associated with a characteristic temperature above which the temperature coefficient of the filament resistance turns negative, that is, allowing the filament to pass more current with rising temperature. Consequently, such a component cannot be controlled by voltage, but rather, by current. Neither can such filaments be connected directly in parallel to increase the radiant source surface as the current tends to concentrate on that filament having the lowest resistance, that is, highest temperature. Series connection on the other hand requires elevating the input voltage to a multiple of the single filament voltage. Boron doping cannot provide a satisfactorily high characteristic temperature, because a high boron impurity concentration achieves only approx. 600° C.

characteristic temperature. If the operating temperature of the filament is higher than this, the filament resistance tends to drift with time. In the embodiment according to cited publication 4, the incandescent filament is made of a thin-film metallization layer. To prevent oxidization, the incandescent filament is encapsulated in a vacuum.

SUMMARY OF THE INVENTION

It is an object of the present invention to overcome the disadvantages of the above-described prior-art techniques and to achieve an entirely novel electrically modulatable thermal radiant source.

The goal of the invention is accomplished by making the incandescent filaments from a metal such as tungsten, titanium-tungsten alloy, tantalum or molybdenum, after which the filament is entirely coated with a thin, uniform layer of oxidization-resistant insulating material such as silicon nitride, for instance. Hence, the incandescent filaments need no vacuum encapsulation. Furthermore, a metallic incandescent filament is free from migration at the current densities normally used to heat the incandescent filament. Resultingly, the long-term stability of a metallic incandescent filament is vastly better than that of a boron- or phosphorus-doped polysilicon incandescent filament. However, since the infra-red emissivity of a metal is inferior to that of doped silicon, the present invention uses very narrow metallic filaments with a sole function to heat the actual thermally radiating layer such as doped polysilicon, which is an electrically conducting material. Therefore, the polysilicon layer must be electrically isolated from the metallic incandescent filaments. Due to its low thermal conductivity, silicon nitride may be advantageously used as a support structure forming a continuous, self-supporting layer extended down to the silicon substrate. Also the polysilicon layer is conformantly coated with silicon nitride.

More specifically, the thermal radiant source according to the invention is characterized by what is stated in the characterizing part of claim 1.

These and other objects of the present invention are accomplished by providing an electrically modulatable thermal radiant source with a multilayer structure comprising: a substrate; a first insulating layer formed onto said substrate, a radiant surface layer formed onto said first insulating layer, a second insulating layer formed on said radiant surface layer, a first metallization layer formed on said second insulating layer, a third insulating layer formed on said first metallization layer, a second metallization layer for contacting formed on said third insulating layer, wherein said first metallization layer forms a planar plate of thin, incandescent filaments, said incandescent filaments being surrounded by said first insulating layer, said radiant layer, said second insulating layer, and said third insulating layer, and said incandescent filaments being spaced from each other over an area of said planar plate, a spacing between adjacent incandescent filaments near edges of said planar plate of incandescent filaments being closer than a spacing between adjacent incandescent filaments near a midportion of said planar plate of incandescent filaments.

The invention offers significant benefits.

The structure according to the invention emits at much higher intensity than a source having the radiant part comprised of separate incandescent filaments. The radiant surface of the present structure is uniform, thus maximizing the useful area of the source.

As the metallic incandescent filaments heating the radiant area can be made narrow and long, the operating voltage of the radiant source according to the invention may easily be adapted equal to that of the interfacing electronics circuitry.

The uniform surface of the layers gives an excellent mechanical strength to the structure according to the invention. It endures well the etching-through of the substrate wafer and sawing of the wafer. A production yield approaching 100% can be attained.

As the thickness of the layers can be adjusted in wide ranges, the shape of a radiation spectrum emitted by the source can be modified by virtue of the interference properties of the multilayer structure without interaction by the thin metallic incandescent filaments. An advantageous rule of design is that the films are dimensioned to form a $\lambda/2$ layer or an integral multiple thereof at a desired wavelength. Then, the emission spectrum is peaked at the desired wavelength.

Temperature measurement of a miniature radiant source is a difficult task, because the temperature of the radiant area is not distributed evenly. The emissivity of the surface may be a function of temperature, which adds an additional complication to its measurement. In the embodiment according to the invention, the radiant source temperature is measured by means of a separate resistor designed integral with the source structure and having a known temperature coefficient. The resistance value of the resistor is sensed using a four-point measurement circuit, whereby the temperature measurement can be exclusively focused on the hottest point of the radiant source. Such a temperature measurement is very useful in comparison of different designs of a radiant source and in protecting the radiant source from an excessively high operating temperature, which might have a service life shortening effect.

Owing to the extremely narrow width of the metallic incandescent filaments used for heating the source, they may be located above the emitting surface. Thence, while they have no significant emissivity reducing effect, they can there be easily contacted via the upper surface of the source, whereby only an opening need be provided in the uppermost insulating layer.

Pressure-equalizing openings made to the layered structure can be used to reduce mechanical stresses imposed on the multilayer structure if the radiant source is to be intimately bonded to a substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1a and 1b are top views of two parallel variants of a thermal radiant source according to the invention;

FIGS. 2a and 2b are top views of two parallel variants of a thermal radiant source according to the invention, here provided with a temperature measurement facility; and FIGS. 3a and 3b are sections A and B of the radiant sources illustrated in FIGS. 1a and 1b.

DETAILED DESCRIPTION OF THE PREFERRED EMBODIMENTS

Referring to FIGS. 1a and 1b, two versions of an electrically modulatable radiant source are shown. In the diagrams, the large unhatched rectangle is a silicon chip 13, wherein an unhatched smaller rectangle 14 drawn in dashed line is an opening covered by a multilayer structure. The metallization of the incandescent filaments 10 is drawn in black, and a metallization 15 contacting the filaments is marked with slanted hatching. The area 11 is the radiating surface. The incandescent filaments 10 are connected in parallel and the electrical connection is made to the metallizations 15. In FIG. 1a, the filaments 10 are located denser toward the chip edges and they are connected in parallel. In FIG. 1b, the filaments are spaced at a constant distance from each other and they are partially connected in series to permit operation at a higher voltage. Sections A and B in the diagrams refer to FIGS. 3a and 3b.

Deposition of required thin-film layers can be made using conventional standard processes of microelectronics.[5] The radiating surface 11 may have an area of 1 mm$^2$, for instance. The incandescent filaments 10 are for their entire length encapsulated by an insulating layer. Thus, the structure of the incandescent filaments 10 is also self-supporting. Openings are made at the incandescent filaments 10 by etching entirely through the substrate wafer 13, starting from the rear side of the wafer 13. The dimensions of the filaments 10 can be, e.g., thickness 0.1–1 $\mu$m and width 2–10 $\mu$m, with a spacing of 20–50 $\mu$m between the filaments. The filaments 10 are heated by the current flowing via them. The required input voltage is dependent on the ratio of the filament length to its cross section and the electrical configuration of the filaments. Typically, the operating voltage is from one volt up to a few volts.

As the metallic incandescent filaments 10 are entirely encapsulated in an insulating material, the oxidization rate of the metal determines the service life of the incandescent filament. If the radiant source is used at a temperature below 800° C. in normal room air, its service life is several years when using silicon nitride as the insulating material. No special hermetic vacuum encapsulation with the necessary radiation output window is required.

The opening 14 under the incandescent filaments 10 can be made in an aqueous solution of potassium hydroxide, KOH. The etchant used can also be an aqueous solution of ethylenediamine with a small amount of pyrocatechol added. Further, tetramethylammonium hydroxide (TMAH) can be used as etchant.

As the incandescent filaments 10 operate without a superimposed window, any organic contamination falling on the filament 10 is burnt away. The crosswise temperature distribution of the incandescent filament 10 can be tuned by varying the interfilament spacing. An even temperature distribution is attained by placing the filaments 10 denser toward the chip edges. The longitudinal temperature distribution of the filaments can be improved by tapering the filaments toward their ends, thus therein increasing the dissipated power density.

The maximum usable modulation rate of the radiant source is dependent on the proportion of thermal losses. The majority of such losses occurs by convection into the surrounding air and via the filament ends to the silicon substrate. As the proportion of radiant losses in the total loss is at a few percent, the temperature of the incandescent filament is an almost linear function of the heating input power. With the structure described herein, a thermal time constant of approx. 10 ms can be attained permitting electrical modulation up to approx. 200 Hz.

Referring to FIGS. 2a and 2b, therein are shown the basic elements of a radiant source incorporating temperature measurement. In the version of FIG. 2a, a portion of the incandescent filament 10 acts as a temperature-dependent resistor 16, whose resistance is sensed in a four-point measurement configuration. Heating current is passed via contacts 1–2, and the voltage drop over the resistor is sensed at contacts 3–4. In the version of FIG. 2b, the temperature measurement circuit is entirely isolated from the circuit heating the incandescent filaments 10. Here, the heating current is passed via contacts 1–2, the measurement current via contacts 5–6, and the voltage drop is sensed at contacts 3–4. To make the temperature-sensing filament 17 longer, it is meandered. The above-described radiant source structure can be used as a reference in testing other radiant sources made in the process.

If the radiant source is intimately bonded to a substrate, the internal pressure of the source increases every time the source is heated. This is because the air in the etched cavity is also heated. Pressure will tend to bulge the multilayered structure outward, thus imposing a mechanical stress thereon. To relieve the stress, the radiant source can be provided with pressure-equalizing openings 30 shown in FIG. 2a that may be located within the area covered by the silicon nitride film.

Referring to FIG. 3, the layered structure of the radiant source is shown in greater detail. Most frequently, the substrate is formed by a (100)-oriented silicon chip 13 having an insulating layer 22, typically a 200 nm thick silicon nitride layer, deposited thereon. Onto the surface of the nitride layer 22 is deposited a typically approx. 1 $\mu$m thick radiant surface 11, typically of a doped polysilicon film acting as the emitter of thermal radiation. Onto this film is deposited a thin insulating layer 24, which is approx. 50 nm thick and typically of silicon nitride, and thereon, an approx. 400 nm thick metallization layer, typically of tungsten, which is patterned into the incandescent filaments 10 and contact pad areas by means of photolithography and plasma etching techniques used in microelectronics manufacture. Next, an upper insulating layer 26 of approx. 200 nm thickness is deposited, typically of silicon nitride. The purpose of the insulating layers 22 and 26 is to protect the metal in the incandescent filament 10 and the radiant surface 11 against oxidation. The function of the insulating layer 24 is to isolate the radiant surface 11 electrically from the metallization layer.

Means for electrical contacts comprise metallization pads 15, which most advantageously can be made of aluminum. These pads form ohmic contacts with the metallic incandescent filaments 10 via openings made into the upper insulating layer 26 by means of, e.g., plasma etching. Other possible materials for the metallization pads are gold and palladium, for instance.

The insulating layers may most advantageously be made from silicon nitride, whose oxidation rate is extremely low. Other possible materials herein are silicon dioxide and aluminium oxide, for instance. Herein, the term insulating material refers to a dielectric material. According to the invention, each layer should have a maximally high thermal conductivity. The incandescent filament is most advantageously made from tungsten. Other suitable filament materials are titanium-tungsten alloy, tantalum and molybdenum.

All materials mentioned above are typical in the art. Obviously, with advances in materials technology, other suitable materials may be selected for the structure according to the invention.

The overall thickness of the layers 22, 11, 24 and 26 may be dimensioned so as to make the multilayer structure to act as an interferometer at a desired IR-range wavelength, thus making it possible to tune the shape of the emission spectrum. The silicon forming the substrate 13 is finally etched away from under the filament 10, whereby an opening 14 is formed. The slope of walls in the opening 14 is determined by the crystalline axis orientation of the silicon wafer used as the substrate. Etching-away is made via the underside of the substrate chip.

The radiant surface 11 formed, e.g., by doped polysilicon layer, may be contoured freely according to the application. The dopants most commonly used are boron, phosphorus or arsenic.

The invention being thus described, it will be obvious that the same may be varied as a departure from the spirit and scope of the invention, and all such modifications as would be obvious to one skilled in the art are intended to be included within the scope of the following claims.

References:
1. H. Guckel and D. W. Burns, "Integrated transducers based on black-body radiation from heated polysilicon films", *Transducers* '85, 364–366 (Jun. 11–14, 1985).
2. Carlos H. Mastrangelo, James Hsi-Jen Yeh, and Richard S. Muller: "Electrical and optical characteristics of vacuum sealed polysilicon microlamps", *IEEE Transactions on Electron Devices*, 39, 6, 1363–1375 (June 1992).
3. M. Parameswaran, A. M. Robinson, D. L. Blackburn, M. Gaitan and J. Geist, "Micromachined thermal radiation emitter from a commercial CMOS process", *IEEE Electron Device Lett.*, 12, 2, 57–59 (1991).
4. Semiconductor International, p. 17, November 1992.
5. S. M. Sze, "VLSI technology", McGraw-Hill Book Company, 3rd printing, 1985, Chapters 5 and 6.

We claim:

1. An electrically modulatable thermal radiant source with a multilayer structure comprising:

a substrate, a first insulating layer formed onto said substrate, a radiant surface layer formed onto said first insulating layer, a second insulating layer formed on said radiant surface layer, a first metallization layer formed on said second insulating layer, a third insulating layer formed on said first metallization layer, a second metallization layer for contacting formed on said third insulating layer, wherein said first metallization layer forms a planar plate of thin, incandescent filaments, said incandescent filaments being surrounded by said first insulating layer, said radiant layer, said second insulating layer, and said third insulating layer and said incandescent filaments being spaced from each other over an area of said planar plate, a spacing between adjacent incandescent filaments near edges of said planar plate of incandescent filaments being closer than a spacing between adjacent incandescent filaments near a midportion of said planar plate of incandescent filaments.

2. A radiant source as defined in claim 1, characterized in that into said substrate is etched an opening at said radiant surface layer.

3. A radiant source as defined in claim 1, characterized in that said first insulating layer is made of silicon nitride, silicon dioxide or aluminum oxide.

4. A radiant source as defined in claim 1, characterized in that said second insulating layer is made of silicon nitride, silicon dioxide or aluminium oxide.

5. A radiant source as defined in claim 1, characterized in that said radiant surface layer is made of polycrystalline silicon.

6. A radiant source as defined in claim 5, characterized in that said radiant surface layer is made of doped polycrystalline silicon.

7. A radiant source as defined in claim 1, characterized in that said first metallization layer is made of tungsten, titanium-tungsten alloy, tantalum or molybdenum.

8. A radiant source as defined in claim 1, characterized in that said third insulating layer is made of silicon nitride, silicon dioxide or aluminium oxide.

9. A radiant source as defined in claim 1, characterized in that said incandescent filaments permit said radiant surface layer to act as the primary source of thermal radiation.

10. A radiant source as defined in claim 1, characterized in that the overall optical thickness of said insulating and radiant layers is $\lambda/2$ or an integral multiple thereof at a desired wavelength.

11. A radiant source as defined in claim 1, characterized in that individual ones of said incandescent filaments are electrically connected in parallel.

12. A radiant source as defined in claim 1, characterized in that individual ones of said incandescent filaments are electrically connected in series.

13. A radiant source as defined in claim 1, characterized in that individual ones of said individual incandescent filaments are electrically connected in a parallel-series configuration.

14. A radiant source as defined in claim 1, characterized in that individual ones of said incandescent filaments are tapered toward their ends.

15. A radiant source as defined in claim 1, characterized in that said radiant source incorporates means for internal temperature measurement.

16. A radiant source as defined in claim 1, characterized in that said radiant source incorporates at least one pressure-equalizing opening.

17. A radiant source as defined in claim 1, characterized in that the width of said incandescent filaments is approximately 2–10 $\mu$m with a thickness of approximately 0.1–1 $\mu$m.

18. A radiant source as defined in claim 1, characterized in that said substrate is made of silicon.

19. A radiant source as defined in claim 18, characterized in that into said silicon substrate is etched an opening at said radiant surface layer.

20. A radiant source as defined in claim 17, characterized in that the spacing between adjacent incandescent filament near a midportion of said planar plate of incandescent filaments is approximately 20–50 $\mu$m.

* * * * *

UNITED STATES PATENT AND TRADEMARK OFFICE
CERTIFICATE OF CORRECTION

PATENT NO. : 5,827,438
DATED : October 27, 1998
INVENTOR(S) : Blomberg et al.

It is certified that error appears in the above-indentified patent and that said Letters Patent is hereby corrected as shown below:

On the title page

Item 54 and Col. 1: Please change the title from "ELECTRICALLY MODULATABLE THERMAL RADIANT SOURCE WITH SPECIFIC FILAMENT" to --ELECTRICALLY MODULATABLE THERMAL RADIANT SOURCE WITH SPECIFIC FILAMENT SPACING--.

Signed and Sealed this

Sixteenth Day of March, 1999

*Attest:*

Q. TODD DICKINSON

*Attesting Officer*  Acting Commissioner of Patents and Trademarks